(No Model.)
C. H. STADELMAN.
JAR OR BOTTLE.
No. 565,371.  Patented Aug. 4, 1896.
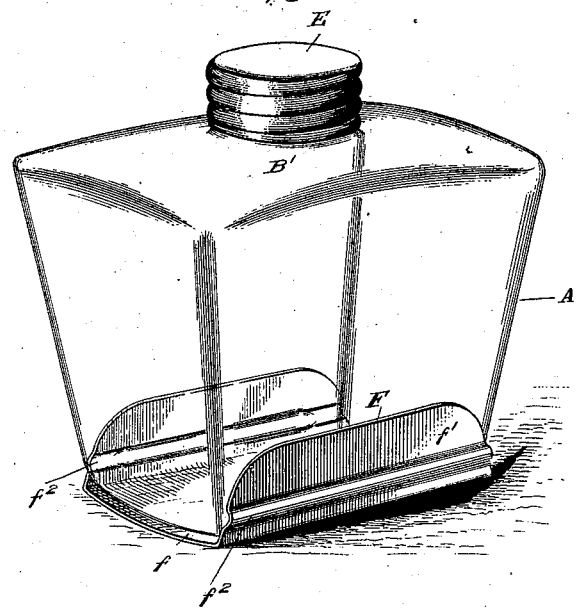
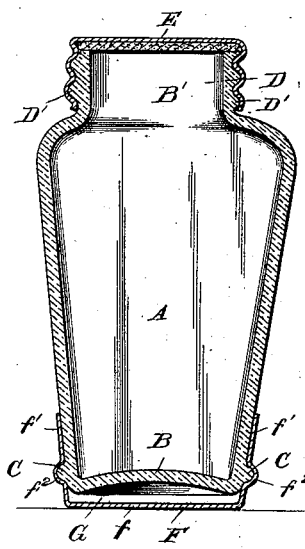
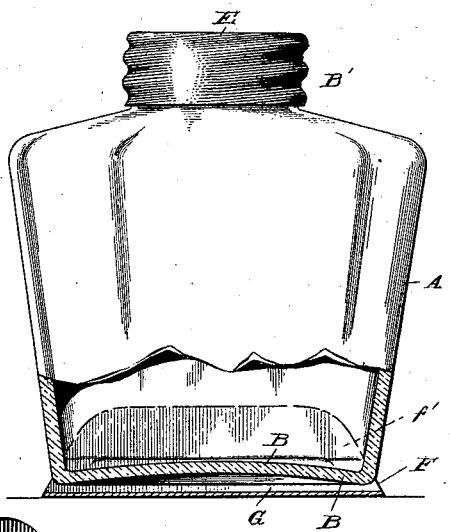
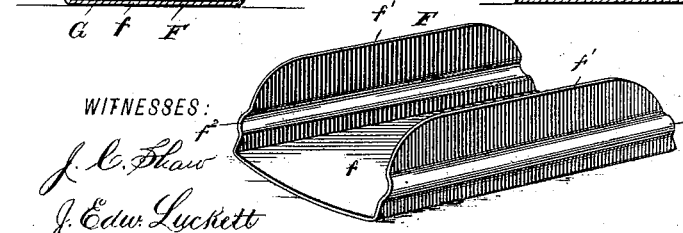
WITNESSES:
J. C. Shaw
J. Edw. Luckett
INVENTOR
Chas. H. Stadelman,
BY
O'Meara & Co.
ATTORNEYS

UNITED STATES PATENT OFFICE.

CHARLES H. STADELMAN, OF PITTSBURG, PENNSYLVANIA.

JAR OR BOTTLE.

SPECIFICATION forming part of Letters Patent No. 565,371, dated August 4, 1896.

Application filed December 18, 1895. Serial No. 572,554. (No model.)

*To all whom it may concern:*

Be it known that I, CHARLES H. STADELMAN, residing at Pittsburg, in the county of Allegheny and State of Pennsylvania, have invented a new and Improved Jar or Bottle, of which the following is a specification.

My invention, which relates generally to improvements to jars and bottles, more especially relates to improvements in glass jars for holding coffee or other liquids, and such invention primarily has for its object to provide a jar of this character of a neat and inexpensive construction, having its bottom portion so constructed as to admit of the contents being readily heated without danger of breaking or cracking by being heated too suddenly.

My invention also has for its object to provide a liquid-holding jar having a metallic bottom portion detachably connected therewith which will serve as a rest portion to seat on the stove and hold the body portion of the jar from direct contact with the heating-surface.

With other minor objects in view which will hereinafter appear my invention consists in a holder for liquids constructed in the manner first described in detail, and then specifically pointed out in the appended claims, reference being had to the accompanying drawings, in which—

Figure 1 is a perspective view of my improved jar complete. Fig. 2 is a transverse section of the same, taken on the line 2 2 of Fig. 3. Fig. 3 is a sectional side elevation taken on the line 3 3 of Fig. 2, and Fig. 4 is a perspective view of the metallic bottom piece detached.

In its practical application my invention comprises a jar or bottle A, which may be of any desired form or shape generally, and provided with a bottom portion having straight parallel front and rear side portions. I prefer, however, to form the jar of the shape shown in the accompanying drawings, by reference to which, and more especially Fig. 2, it will be noticed in cross-section the body is of a wedge or keystone shape, while the under side of the bottle B is made concaved transversely and longitudinally for a purpose presently explained.

Near the lower end the front and rear faces of the bottle have horizontal parallelly-disposed external ribs C C, while the top B' has a filling-neck D, having external threads D' to receive the metal screw-cap E, having the usual cork filling in the top, as shown.

F indicates a metallic bottom piece, the construction of which is best illustrated in Fig. 4, by reference to which it will be seen the same consists of a flat bottom portion $f$ and vertically-projected side flanges $f'$, which have horizontal grooves $f^2$.

The bottom piece F, which is preferably made of tin, has its grooves $f^2$ disposed somewhat above the bottom $f$, while the ribs C C on the jar are at or near the lower edge thereof.

In practice the bottom piece F is slid endwise onto the jar, with its grooves $f^2$ fitting over the ribs C C, and such piece is securely clamped to the jar by the spring of the side flanges $f'$, which, owing to the diverging of the front and rear faces of the jar, are slightly expanded or bent out as they are slid onto the jar, causing, as it were, an inward pressure against the bottle.

By concaving the bottom of the bottle and arranging the grooves $f^2$ at a point above the bottom $f$, it follows that the bottom of the bottle or jar will be held above the said bottom $f$ and thereby provide a space G for a free circulation of the air, such provision having for its purpose to prevent the bottom of the jar becoming heated too quickly or from being in a direct engagement with the heating-surface.

While it is not absolutely necessary, I prefer to make the bottom portion $f$ of a length somewhat more than the length of the jar, as shown in Fig. 3, to prevent direct heat-rays engaging the lower outer edges of the jar.

While I prefer to join the tin bottom to the jar by the rib or groove connections, it is obvious that any equivalent means may be provided for the same purpose, so arranged, however, as to keep the bottom of the bottle and the plate slightly separated.

From the foregoing description, taken in connection with the accompanying drawings, the advantages of my invention will be readily understood and appreciated.

Having thus described my invention, what I claim, and desire to secure by Letters Patent, is—

1. An improved bottle-holder open at each end, and comprising a flat base portion and parallel vertical side flanges, said flanges having horizontal grooves produced therein some distance above the base-plate, substantially as shown and described.

2. The combination with a bottle having flat sides, and horizontal ribs near the bottom, of a holder, comprising a flat base and vertical side flanges, said flanges having horizontal grooves to receive the horizontal ribs on bottle, substantially as shown and described.

3. A jar or bottle for the purposes stated having its bottom made concaved and having external ribs in combination with the sheet-metal bottom piece, having side flanges adapted to embrace the opposite faces of the bottle and having longitudinal grooves adapted to engage the ribs on the said bottle, said grooves being disposed at a point above the bottom of the metal portion in such a manner that when the said plate is fitted on the bottle the said bottom will be held spaced apart from the bottle as and for the purposes described.

4. An attachment for liquid-holding bottles formed with rib portions at or near the lower end, said attachment consisting of a sheet-metal portion having a bottom portion $f$, vertical side flanges $f'$, said side flanges having longitudinal grooves $f^2$, all arranged substantially as and for the purposes described.

CHARLES H. STADELMAN.

Witnesses:
JAMES A. McKEAN,
H. B. WILKINS.